United States Patent
Nufer et al.

(10) Patent No.: US 8,875,749 B2
(45) Date of Patent: Nov. 4, 2014

(54) METHOD FOR THE PREPARATION OF SAMPLES

(75) Inventors: Bruno Nufer, Illnau (CH); Siegfried Gluvakov, Neuhaus (CH)

(73) Assignee: Mettler-Toledo AG, Greifensee (CH)

( * ) Notice: Subject to any disclaimer, the term of this patent is extended or adjusted under 35 U.S.C. 154(b) by 733 days.

(21) Appl. No.: 13/225,306

(22) Filed: Sep. 2, 2011

(65) Prior Publication Data

US 2012/0055579 A1    Mar. 8, 2012

(30) Foreign Application Priority Data

Sep. 2, 2010 (EP) .................................. 10174992

(51) Int. Cl.
| | | |
|---|---|---|
| B65B 3/04 | (2006.01) | |
| G01G 23/00 | (2006.01) | |
| G01G 13/00 | (2006.01) | |
| G01G 13/24 | (2006.01) | |
| B65B 3/28 | (2006.01) | |
| B65B 1/32 | (2006.01) | |

(52) U.S. Cl.
CPC .............. *G01G 13/003* (2013.01); *G01G 23/00* (2013.01); *G01G 13/24* (2013.01); *B65B 3/28* (2013.01); *B65B 1/32* (2013.01)
USPC ... 141/1; 141/83; 141/94; 222/77; 222/181.1; 222/1; 177/1; 702/173

(58) Field of Classification Search
CPC .................. B01L 2200/0657; B01L 2200/143; B01L 2200/148; G01G 13/24; G01G 13/02; B65B 3/28; B65B 1/30; B65B 1/32; B65B 1/34; B65B 1/46
USPC .......... 141/1, 2, 11, 83, 94; 222/181.1, 1, 77, 222/55, 59, 63, 64; 702/173; 177/1, 25.13
See application file for complete search history.

(56) References Cited

U.S. PATENT DOCUMENTS

| | | | | |
|---|---|---|---|---|
| 7,284,574 | B2 * | 10/2007 | Fontaine et al. | 141/72 |
| 7,323,645 | B2 * | 1/2008 | Nufer et al. | 177/180 |
| 8,225,824 | B2 * | 7/2012 | Eliuk et al. | 141/192 |
| 2008/0173668 | A1 | 7/2008 | Bloechlinger et al. | |
| 2009/0014086 | A1 | 1/2009 | MacMichael et al. | |
| 2009/0078334 | A1 | 3/2009 | Nufer | |
| 2010/0206098 | A1 | 8/2010 | Wilby | |

FOREIGN PATENT DOCUMENTS

DE    19920494 A1    6/2000

* cited by examiner

*Primary Examiner* — Timothy L Maust
*Assistant Examiner* — Timothy P Kelly
(74) *Attorney, Agent, or Firm* — Standley Law Group LLP

(57) ABSTRACT

A method for the preparation of samples by means of a dosage-dispensing device, a weighing system with a load receiver, a processor unit, a memory unit, and an exchangeable dosage-dispensing unit. A target container is set on the load receiver. The dosage-dispensing unit and/or the target container includes electrically insulating material. The dosage-dispensing unit has the capability to change positions relative to the load receiver. While the dosage-dispensing unit is in a first position and a target container is on the load receiver, a starting weight value is determined, the dosage-dispensing unit is brought into a second position, a dosage-dispensing cycle delivers a dosage material in a predefined amount from the dosage-dispensing unit into the target container by means of the processor unit, the dosage-dispensing unit is brought into the first position, and while the dosage-dispensing unit is at rest in the first position, an ending weight value is determined.

16 Claims, 4 Drawing Sheets

METHOD FOR THE PREPARATION OF SAMPLES

CROSS-REFERENCE TO RELATED APPLICATIONS

This application claims the benefit of a right of priority under 35 USC §119 from European Patent Application No. 10174992.7, filed Sep. 2, 2010, the contents of which are incorporated by reference as if fully recited herein.

TECHNICAL FIELD

The invention concerns a method for the preparation of samples by means of a dosage-dispensing device, a computer program in which the method steps are implemented, and a dosage-dispensing device in which the computer program is stored.

BACKGROUND

Dosage-dispensing devices and dosage-dispensing methods of the aforementioned kind are commonly known in many fields of industry and have been in use for years. They include in most cases a gravimetric measuring instrument, specifically a weighing system, by means of which the dispensed mass of dosage material is measured. The amounts of mass to be measured range from tons down to the smallest quantities of a few micrograms. Especially the dispensing of minuscule amounts, for example in the development of new active ingredients, requires the highest precision, as even the smallest deviation of the mass of the active ingredient can strongly affect the experiments that are performed after the dosage-dispensing process. For instance, when substances are mixed together, the reaction rates can vary considerably as a result of mass deviations; or in clinical tests, the effects on the organism of the test person can deviate considerably from the expected outcome, to name only a few examples.

In order to perform the experiments, one has to prepare a large number of samples. For example, small amounts of pulverous substances are dispensed into a target container, where they are dissolved by adding a solvent. The sample which has been prepared in this manner is subsequently analyzed, for example in an HPLC (High Performance Liquid Chromatography) analyzer.

A dosage-dispensing device capable of measuring out minute amounts of mass and a method of optimizing a dosage-dispensing process are disclosed in EP 1 947 427 A1. The dosage-dispensing device includes a weighing system with a load receiver, a processor unit, a memory unit, and an exchangeable dosage-dispensing unit. The dosage-dispensing unit is arranged above the load receiver on which a target container can be set in place. So that target containers of different heights can be used, the dosage-dispensing unit is height-adjustable in relation to the load receiver.

Extraneous influences play an important part when extremely small masses are measured out. Air movements, temperature fluctuations and the like can strongly influence the weighing result or, more specifically, the weight values determined by the weighing system. If these weight values are used for the control of the dosage-dispensing process and as a basis for the amount or mass of solvent that is to be subsequently added, the aforementioned extraneous factors can lead to faulty samples.

When measuring out pulverous substances with the dosage-dispensing device of the foregoing description, it was found that electrostatic effects, too, can introduce significant errors into the weighing results. If the target container and/or the dosage-dispensing unit include materials that are not electrically conductive, they can become electrostatically charged. This can have the consequence that the target container and the dosage-dispensing unit mutually repel or attract each other. Accordingly, the weighing system will measure values that are higher or lower than the mass that is actually present in the target container.

As a solution to this problem, ionizers are being offered by means of which the ambient air of the dosage-dispensing unit and the target container is ionized, whereby the static charges can be effectively eliminated. However, as these ionizers use high voltage levels and therefore generate an electromagnetic field, their operation can likewise have a harmful influence on the weight values of the weighing system. Furthermore, the ion flow of the ionizer can set air masses into motion and the latter can exert a force on the load receiver.

In a further approach to solve this problem, all components of the dosage-dispensing device, the dosage-dispensing unit and the target container are made electrically conductive and are connected to ground. This usually leads to very good results. However, it involves the application of metallic coatings or the fabrication of metal parts, which increases the cost considerably, since non-conductive materials have to be coated with a layer of conductive material, or the respective parts have to be made of metal.

In addition, extensive experiments have shown that the ability to accumulate electrostatic charges is not limited to the dosage-dispensing unit and/or the target container. There are also some pulverous substances which are critical in regard to their electrostatic behavior and can build up a significant electrostatic charge as a result of break-up and friction effects during the dispensing process. Even with the use of electrically conductive, grounded target containers or dosage-dispensing units and/or an ionizer, no satisfactory solution has been found for this problem. For example, when measuring out paracetamol (also known as acetaminophen) in dosage quantities of 12 mg, deviations due to electrostatic effects could be observed which amounted to as much as 40% of the specified mass.

SUMMARY OF THE INVENTION

The present invention therefore has the objective of proposing a method which serves to prepare samples by means of a dosage-dispensing device and allows an extremely precise measurement of the amount of dosage material dispensed into the target container. A further objective is to create a dosage-dispensing device with the capability to carry out the method. This task is solved with a method, a computer program, and a dosage-dispensing device that have the features described in the independent patent claims.

BRIEF DESCRIPTION OF THE DRAWINGS

Different embodiments of the dosage dispensing device and method are described in more detail by referring to the attached drawings, wherein.

DETAILED DESCRIPTION

Figure 1:
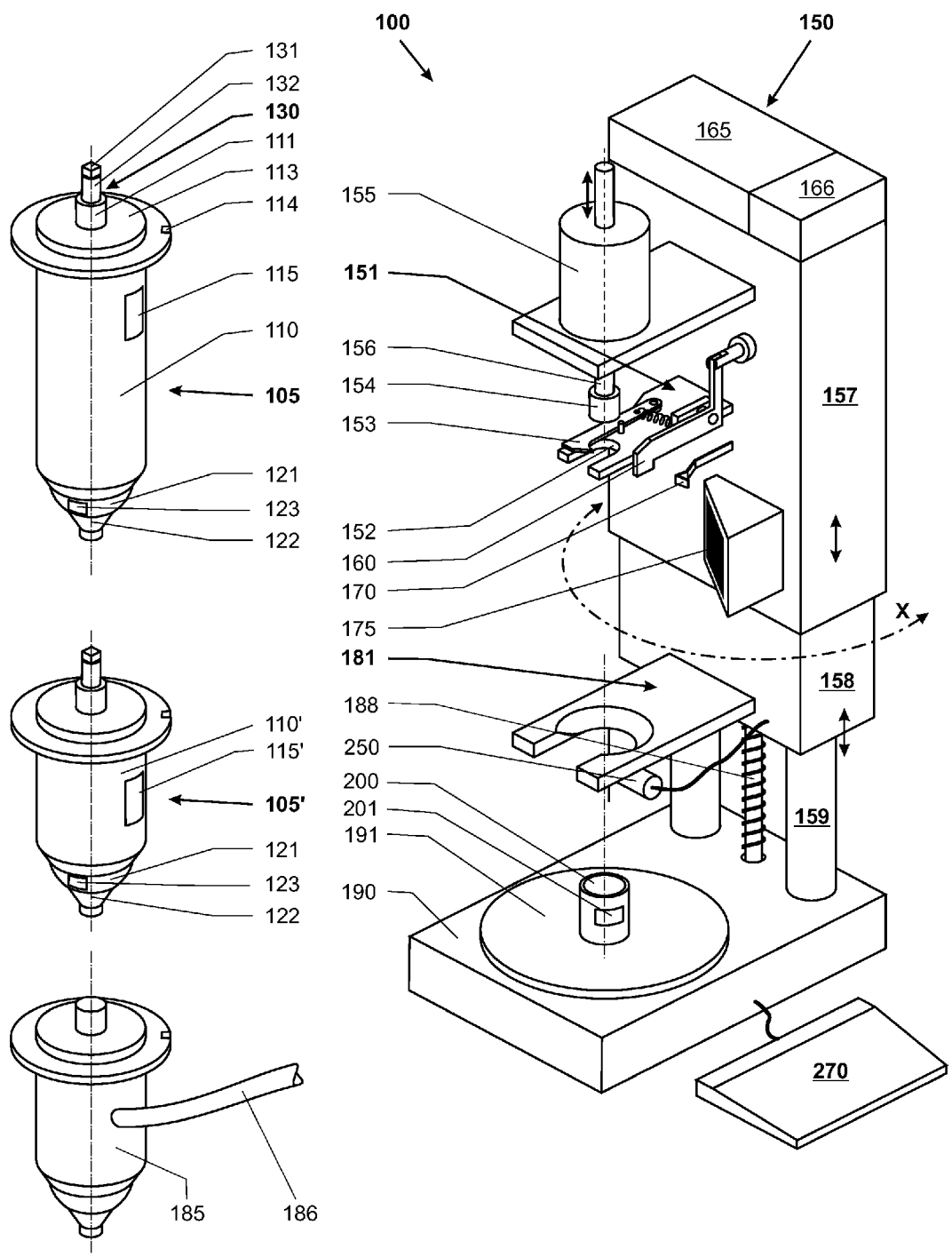
FIG. 1 represents a dosage-dispensing device according to the invention with a drive device and with two source containers of different lengths that are equipped with dosage-dispensing heads, with the dispensing heads being shown separate from the drive device.

To execute the method for the preparation of samples, a dosage-dispensing device needs to be available which includes a weighing system with a load receiver, a processor unit, a memory unit, and an exchangeable dosage-dispensing unit. A target container can be set on the load receiver. The dosage-dispensing unit and/or the target container can include electrically insulating material. The dosage-dispensing unit is arranged above the load receiver with the capability to slide or swivel between a first position and a second position relative to the load receiver.

Under the method for the preparation of samples:

while the dosage-dispensing unit is at rest in the first position and a target container is in place on the load receiver, a starting weight value is determined by the weighing system and stored in the memory unit;

the dosage-dispensing unit is brought into the second position;

a dosage-dispensing cycle is performed and dosage material is delivered from the dosage-dispensing unit into the target container in accordance with a predefined amount of mass by means of the processor unit;

the dosage-dispensing unit is brought into the first position; and while the dosage-dispensing unit is at rest in the first position, an ending weight value is determined by the weighing system.

The predefined mass is the target value which is set by the user by making an entry in an input unit of the dosage-dispensing device. The method is based on the realization that in the analysis of samples the prepared overall sample mass is not so much of a factor, but that it is critical to know the exact concentration of the substance dissolved in the solvent. In order to be able to calculate the exact concentration, it is therefore necessary that the respective masses of the substance and of the solvent can be measured with the highest possible accuracy.

So that no dosage material is spilled during the dosage-dispensing process, the dosage-dispensing unit—more specifically its delivery orifice—needs to be located very closely above the fill opening of the target container. Thus, the second position also depends on the height of the target container standing on the load receiver. As a result of sliding or swiveling the dosage-dispensing unit relative to the load receiver as specified in the invention, a precise measurement of the actually dispensed mass is made possible, because the influence of electrostatic attraction forces decreases quadratically with the increased distance between the dosage-dispensing unit and the target container. Accordingly, in a method according to an example embodiment of the invention, the starting and ending weight values which are used for the calculation of the mass that is actually present in the target container are always measured in the first position, where the dosage-dispensing unit is at its maximum distance from the target container and from the load receiver.

Subsequently, the processor unit can subtract the starting weight value from the ending weight value. The result, which represents the weighed mass of the dosage material, is then stored in the memory unit or transmitted to an output unit or a process control system. The weighed mass is an uncorrected actual value for the amount of dosage material in the target container. This value is referred to as uncorrected because the weight values measured in the first position can still include errors due to electrostatic charges, as the distance between the first and second positions should be kept within reasonable limits in order to restrict the dosage-dispensing device to a practical overall size. However, in most cases the mass is adequately determined as an uncorrected actual value.

To provide the capability for preparing mixtures of dosage materials, the method of the foregoing description can be extended to include further steps, specifically:

based on the weighed mass of the dosage material and a desired mix ratio, the mass amount of a further dosage material is calculated by the processor unit;

the dosage-dispensing unit with the dosage material that has already been dispensed is replaced by a further dosage-dispensing unit with the further dosage material;

the steps of the sequence described above are repeated with the further dosage-dispensing unit.

In the present context, the term "mixture" means a mix of at least two solid, paste-like, or liquid substances. Of course, one of the substances can be solid while the other is liquid. A substance to which a solvent has been added is referred to herein as a solution, regardless of whether or not the substance is dissolved in the solvent.

The first and second positions can also be used to establish whether electrostatic charges are even present. This is possible with a simple test. If the weighing system delivers identical weight values for the first position and the second position (provided that no substance is being discharged from the dosage-dispensing unit), this indicates an absence or only a small accumulation of electrostatic charges. Accordingly, a test value which is registered in the second position is compared to the starting weight value. If the two weight values differ from each other, the dosage-dispensing process can be blocked and the user can be warned. Of course, it is also possible that an ionizer which is arranged in the dosage-dispensing device is switched on either automatically or by intervention of the user if electrostatic charges have been detected in the comparison described here.

Even if the weight values for the calculation of the amount of dosage material dispensed are measured in the first position, electrostatic forces that may be present can still affect the weighing system to a minor extent. With the help of Coulomb's law, the values measured in the first and second positions allow a determination and quantification of the electrostatic forces that come to bear in the first position. The method according to an example embodiment of the invention can be extended with the further steps, wherein:

after the dosage-dispensing process has been completed, an error value for the weight is determined in the second position by the weighing system;

based on the ending weight value, the error value and the distance between the first and second positions a correction value is calculated; and based on the weighed mass of the dosage material and the correction value, the corrected mass of the dosage material is calculated.

Further, based on the weighed mass or the corrected mass of the dosage material and a desired concentration, the mass of a solvent that needs to be added can be calculated by the processor unit.

To control the dosage-dispensing process, the weighing system can acquire intermediate weight values continuously, at discrete, event-triggered, or random intervals during the dosage-dispensing process, and the intermediate weight values can be entered into the processor unit for the control of the dosage-dispensing process. Of course, the intermediate weight values, too, can be corrected with a previously determined correction value.

The intermediate weight values can be used in different ways. The easiest approach is to directly actuate a shutter body of the dosage-dispensing unit, so that the shutter body closes off the outlet opening as soon as the intermediate weight value is equal to the predefined value. However, this method normally causes an overshooting of the predefined value. More precise results can be achieved by estimating ahead when the outlet orifice will have to be closed. This requires an evaluation of at least two intermediate weight values, the time interval between them, and the aperture cross-section of the outlet orifice of the dosage-dispensing unit at the times when the intermediate weight values were measured. Based on this information, a flow parameter can be determined which characterizes the flow properties of the dosage material.

Subsequently, a time profile for the closing can be estimated by means of the flow parameter. The aperture of the dosage-dispensing unit is then closed down according to this time profile.

Of course, the dosage-dispensing device can include an ionizer, so that electrostatic charges can be neutralized as much as possible already before the start of the dosage-dispensing process. The ionizer is preferably switched on when the dosage-dispensing unit is shifted from the first to the second position.

The ionizer can also be switched on and off periodically during the dosage-dispensing process. However, in view of the aforementioned side effects, the measurement of the intermediate weight values preferably takes place only when the ionizer is switched off.

The method according to an example embodiment of the invention and its individual steps can be implemented in a computer program which is executable in the processor unit of a dosage-dispensing device for the preparation of the samples. This allows the user to select and assemble the desired process steps from the many that are available, but the following steps are typically included:

while the dosage-dispensing unit is at rest in the first position and a target container is in place on the load receiver, a starting weight value is measured by the weighing system and is stored in the memory unit;

the dosage-dispensing unit is brought into the second position;

a dosage-dispensing process is performed, wherein under the control of the processor unit dosage-material of a predefined mass is dispensed from the dosage-dispensing unit into the target container;

the dosage-dispensing unit is brought into the first position; and while the dosage-dispensing unit is at rest in the first position, an ending weight value is measured by the weighing system.

The computer program can be used in a dosage-dispensing device. The latter includes at least a weighing system, a processor unit, a memory unit, and an exchangeable dosage-dispensing unit, wherein the dosage-dispensing unit is arranged above a load receiver of the weighing system and is capable of being shifted or swiveled between a first position and a second position. The computer program is preferably stored in the memory unit. However, this does not mean that the program always has to be stored in the memory unit. It can also be stored on a data carrier or server and be made accessible to the processor unit through suitable means.

The dosage-dispensing device is preferably equipped with a holder device to which a dosage-dispensing unit can be interchangeably connected. The holder device can be configured so that the movement of the holder device, and thus also of the connected dosage-dispensing device, is constrained by a vertical linear guide so as to be movable between the first position and the second position by means of a drive unit.

To provide a stable hold in the first position and in the second position, the drive unit preferably includes a self-locking spindle for the conversion of rotary into linear motion.

For the complete preparation of a sample by means of the dosage-dispensing device, the latter is capable of dispensing liquids. The dosage-dispensing device can therefore also include a dosage-dispensing head for liquids by means of which a quantity of solvent that has been calculated by the processor unit can be dispensed into the target container.

Details of the method according to an example embodiment of the invention and the dosage-dispensing device according to an example embodiment of the invention are presented through the examples of embodiments illustrated in the drawings and described hereinafter.

FIG. 1 shows a dosage-dispensing device 100 which has a drive device 150 designed for a dosage-dispensing unit 105, 105' to be installed and also to be removed again. The dosage-dispensing unit 105, 105' includes a dosage-dispensing head 122 and a source container 110, 110'. Also shown in the drawing is a liquid-dispensing head 185 which can be supplied with a liquid through a hose connector 186. The liquid-dispensing head 185 has an outside contour shape that matches the shape of the dosage-dispensing unit 105, 105' to the extent that the liquid-dispensing head 185 can likewise be inserted into the drive device 150. A magnet valve (not shown in the drawing) is arranged inside the liquid-dispensing head 185 to control the mass flow rate.

The drive device 150 has an upper part 157 and a lower part 158. In the operating position of the dosage-dispensing device 100, the two parts are capable of linear movement away from each other and towards each other in an essentially vertical direction. This makes it possible to use source containers 110, 110' of different lengths. To allow an easy exchange of the dosage-dispensing unit 105, 105' and a safe and accurate dispensing operation, the dosage-dispensing unit 105, 105' and the drive device 150 should be equipped with suitable mechanical—or, if necessary, mechanical as well as electrical—connector elements designed for form-fitting engagement with each other. The dosage-dispensing unit 105, 105' has at least a first form-fitting element 111 which, by means of a first counterpart 151 that is formed on or connected to the upper part 157, is held in a defined position in a horizontal plane (relative to the operating position of the dosage-dispensing device 100). The dosage-dispensing unit 105, 105' further includes at least a second form-fitting element 121 which is spatially positioned relative to the drive device 150 by means of a second counterpart 181 that is formed on or connected to the lower part 158. As a result of this arrangement, the dosage-dispensing unit 105, 105', specifically its outlet orifice for the delivery of dosage material, is precisely aligned relative to a target container 200. Arranged at the second counterpart 181 is an ionizer 250, which helps to at least reduce electrostatic charges of the dosage-dispensing unit and/or the target container. The dosage-dispensing device 100 is connected to an input/output unit 270 through which data can be entered such as for example a predefined and the desired mass tolerance as well as mix ratios and desired concentrations, and which provides an indication when the dosage-dispensing process or the sample preparation has been completed. In addition, many different kinds of information can be called up or entered by way of the input/output unit 270. In addition, a processor unit 165 of the dosage-dispensing device 100 can generate different messages and warnings and pass them on to the user by way of the input/output unit 270.

The processor unit 165 also controls and regulates the entire sample preparation, in particular the dosage-dispensing process. To perform this function, a computer program that is stored in the memory unit 166 is called up and the process steps that are implemented in it are executed. Also, various items of information that depend on the currently performed process step are called up through the processor unit 165, for example mass data that are requested from the user through the input/output unit 270, or intermediate weight values of the dosage-dispensing process which come from a weighing system 190.

The source container 110 in FIG. 1 has a basically cylindrical shape. However, other shapes for the source container are also possible, for example with a square, hexagonal or octagonal cross-section on the outside and inside. After the dispensing head 122 with the source container 110, 110' has been seated in the drive device 150, its longitudinal axis is oriented vertically in the operating position of the apparatus, the dispensing head 122 being arranged at the second end of the source container 110, 110'. Incorporated in the dispensing head 122 is a shutter body (not shown in the drawing) which can be set into rotation by a drive source. The shutter body is connected to a shutter shaft 132 that is movably constrained in the source container 110. The body of the source container 110 is designed with a tubular shape and is closed off at the top by a lid 113. The lid 113 contains a pass-through opening 130 in which the end of the shutter shaft 132 that is farthest from the shutter body is rotatably constrained and protrudes to the outside of the source container 110. This end of the shutter shaft 132 carries a coupling part 131 which in this example is configured as a square profile section. At least during the dosage-dispensing process, the coupling part 131 is connected through a coupling socket 154 with the drive source 155 that is incorporated in the drive device 150. To allow the coupling to be engaged, the drive source 155 or at least a drive shaft 156 connected to the drive source should be capable of linear vertical movement (relative to the operating position). Of course, instead of the square profile section, any of the known form-locking or friction-based couplers could be used, provided its coupling halves are easily separable.

To prevent the first form-fitting element 111 from slipping out of the first counter part 151, a spring-biased retainer latch 153 pushes the form-fitting element 111 against a slot bottom 152 when the dosage-dispensing unit 105, 105' is seated in place. To remove the dosage-dispensing unit 105, 105' from the drive device 150, the retaining latch 153 can be opened electromechanically or pneumatically. As shown in FIG. 1, with a suitable design of the retainer nose, the retainer latch 153 can be pushed aside by the form-fitting element 111 by applying a considerable amount of force for the removal of the dosage-dispensing unit 105, 105'. The spring-biased retainer latch 153 and/or the slot bottom 152 can in addition be equipped with electrical contacts which—when the dosage-dispensing unit 105, 105' is seated in place—join up with matching contacts that are arranged at the first form-fitting element 111 or at the source container 110, whereby an electrical connection is established between the dosage-dispensing unit 105, 105' and the drive device 150. An electrical connection of this kind can be used to connect the dosage-dispensing unit 105, 105' to ground or, as will be described below, also to connect to a memory module 115, 115', 123 that is arranged in or at the dosage-dispensing unit 105, 105'. In addition to storing a flow parameter, this memory module 115, 115', 123 can also be used to store the length of the source container 110, 110', so that the drive device 150 can automatically adapt itself to the different lengths of the source containers 110, 110'. The same applies of course also to the liquid-dispensing head 185.

The drive device 150 further includes a locking device 160 which, when the dosage-dispensing unit 105, 105' is seated in place, bears against the lid 113 and secures the dosage-dispensing unit 105, 105' against dislocation in the vertical direction. As already mentioned in regard to the retainer latch 153, the locking device 160 can likewise be equipped with additional electrical contacts and connections to the memory module 115, 115', 123 and can be actuated electromechanically or pneumatically.

Furthermore, there is a notch 114 formed on the lid 113. When the dosage-dispensing unit 105, 105' is seated in place, this notch 114 is engaged by a rotation lock 170 which serves to take up and counteract the torque that is exerted on the dosage-dispensing unit 105, 105' by the drive source 155. The rotation lock 170 is configured in this example as a simple spring latch, so that in the process of setting the dosage-dispensing unit 105, 105' in place, the position of the notch 114 relative to the rotation lock 170 is of no concern. As soon as the drive source 155 is coupled to the shutter shaft 132 by way of a drive shaft 156 and a torque is acting on the shutter shaft 132, the dosage-dispensing unit 105, 105' is taken along until the rotation lock 170 snaps into engagement. Of course, the dosage-dispensing unit 105, 105' can also be turned manually into the correct position. Besides a spring latch, one could also use bolts, pins, gripping claws and the like for the rotation lock 170. In addition, the rotation lock 170 could also have an electrical connection to the memory module 115, 115', 123, analogous to the connection of the retainer latch 153 described above. As an additional function, the rotation lock 170 shown here acts at the same time as an overload release for the drive source in case the shutter shaft 132 gets blocked in the dosage-dispensing unit 105, 105'. Of course, the notch 114 can be formed at any desired location of the dosage-dispensing unit 105, 105', and the rotation lock 170 can be arranged at an appropriately matched position on the drive device 150.

However, the memory module 115, 115', 123 does not necessarily have to be physically connected to the processor unit 165 of the dosage-dispensing device 100 through an electrical conductor such as a signal cable or a bus system and the like. It is also possible to use a wireless connection, for example by way of a read/write device 175 operating inductively or through radio transmission. In particular, a device based on RFID transponder technology suggests itself for this purpose.

To collect the respective input variables for the regulation and control of the dosage-dispensing process, the drive device 150 has an electrical connection (not shown in the drawing) to the weighing system 190 on whose load receiver 191 the target container 200 is placed. The target container 200 can include a target container memory module 201 which is preferably accessed through a wireless connection, for example also through the read/write device 175, and in which characterizing attributes of the prepared sample can be stored, such as the designation of the substance, the mix ratio, the solvent, the concentration of the solution, the expiration date or a flow parameter of the substance.

A linear-guiding device 159 is arranged between the drive device 150 and the weighing system 190 and mechanically connects the two units. The linear-guiding device 159 makes it possible to use target containers 200 of different shapes and with different container heights. The arrangement further allows the dosage-dispensing unit 105, 105' or the liquid-dispensing head 185 to be raised to a sufficient distance from the target container 200, so that weight values can be determined by the weighing system 190 with minimal or no errors due to the forces of electrostatically charged parts. Of course, it is also possible to choose an arrangement that deviates from FIG. 1, where the weighing system 190 is mechanically separate from the drive device 150. This avoids the problem of vibrations of the drive device 150 being transmitted to the weighing system 190 during the dispensing process, whereby the weight values and/or the response time of the weighing system 190 could be negatively affected. The position of the dosage-dispensing unit 105, 105' where its distance from the target container 200 and from the load receiver 191 is sufficient for the determination of the weight values is defined as the first position. The position during the dispensing process, where the dosage-dispensing unit 105, 105' is as close as possible to the target container 200 and the load receiver 191, is defined as the second position. A drive unit with a threaded spindle 188 serves to move the dosage-dispensing unit from the first to the second position. Of course, instead of the threaded spindle 188 and the linear-guiding device 159, there can be a swivel hinge (not shown in the drawing) arranged between the drive device 150 and the weighing system 190, so that the drive device 150 can be swiveled between different positions relative to the weighing system 190. With the swivel arrangement, the drive device 150 and the dosage-dispensing unit 105, 105' that is seated in it can be swiveled into a first and a second position as indicated by the dash-dotted double arrow X. Of course, a horizontal linear sliding arrangement of the dosage-dispensing unit 105, 105' relative to the weighing system 190 is also a possible alternative.

Figure 2:
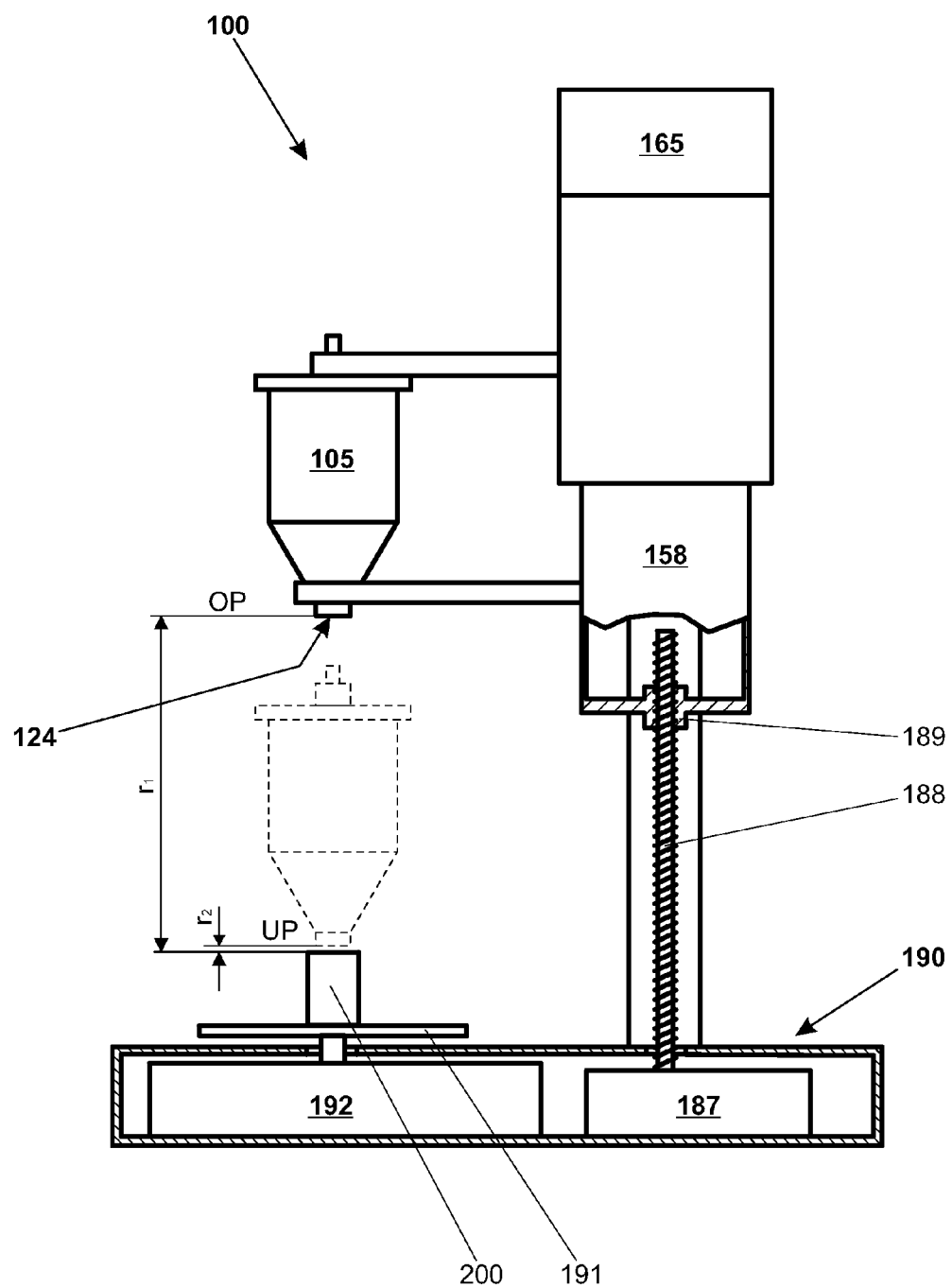
FIG. 2 shows a simplified representation of the dosage-dispensing device of FIG. 1 in side view to illustrate the first position and the second position, including the drive unit for changing the position of the dosage-dispensing unit.

The first position OP and the second position UP are illustrated in FIG. 2 which shows the dosage-dispensing device 100 in a schematically simplified side view. Those parts that are identical to the parts shown in FIG. 1 carry the same reference symbols again in FIG. 2. The second position UP nearly equals the container height of the target container 200, as the outlet orifice 124 of the dosage-dispensing unit 105 should during the dispensing process be positioned at the smallest possible distance $r_2$ next to the fill opening of the target container 200, but without touching the latter. The first position OP preferably represents the maximally possible distance $r_1$ of the fill opening 124 from the target container 200, or the maximum distance from the load receiver 191 that is achievable with the given length of the linear-guiding device. However, as described below in reference to FIG. 4, it is also possible to define another, smaller distance as the first position OP, if the influence of electrostatic forces is small or if it can be accounted for by means of a correction value. Of course, the method according to an example embodiment of the invention can also be performed with an arrangement where the dosage-dispensing unit 105, 105' can be swiveled laterally relative to the target container 200, in which case the dosage-dispensing unit 105, 105' in the second position is located exactly above the target container 200. Accordingly the first position OP is represented by the swiveled position in which the dosage-dispensing unit 105, 105' is laterally offset from the target container 200.

Arranged in the housing 193 of the weighing system 190 (shown in a sectional view) is a weighing cell 192 which is mechanically connected to the load receiver 191, converting the load resting on the load receiver 191 into a weighing signal. The weighing signal is passed on to the processor unit 165 where it is processed further, for example into weight values. Also arranged in the housing 193 is a drive unit 187 with the threaded spindle 188. The latter passes through the housing 193 and is engaged by a spindle nut 189 which is arranged in the lower part 158 of the drive device 150.

Figure 3:
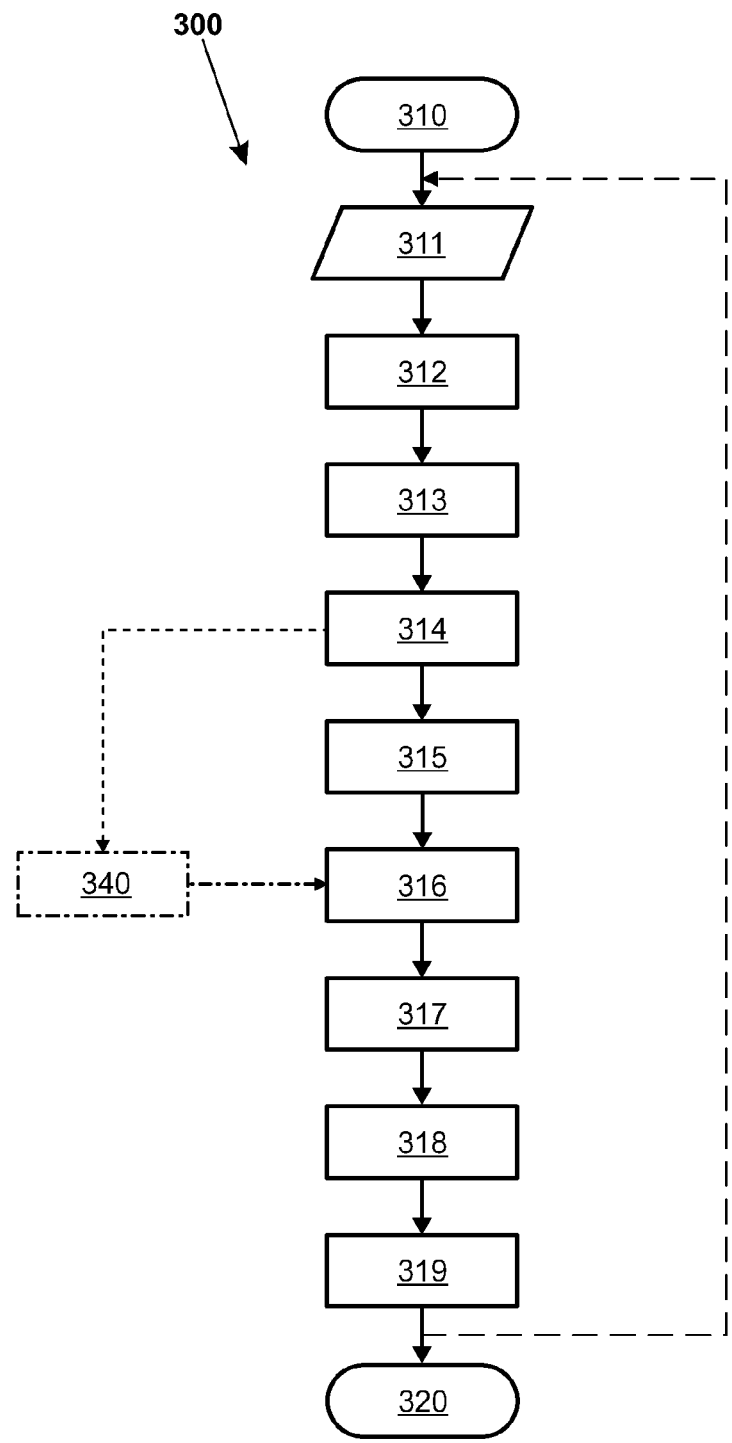
FIG. 3 represents a flowchart diagram of the method according to an example embodiment of the invention.

FIG. 3 represents a flowchart diagram of the method 300 according to an example embodiment of the invention, containing only those steps that are absolutely necessary. Beginning at the start 310, the user is asked in a first step 311 to enter the predefined mass of dosage material. In a second step 312, the user needs to set a new dosage-dispensing unit into the drive device. The third step 313 consists of a check to determine whether the dosage-dispensing unit is located in the first position. If this is not the case, then the dosage-dispensing unit—more specifically the holder device in which the dosage-dispensing unit is seated—needs to be moved into the first position. In a fourth step 314, a target container is set on the load receiver and a starting weight value is established. Next, in the fifth step 315, the dosage-dispensing unit is moved into the second position with the help of the drive unit. A test is now made in step 340, in which a test weight value is determined and compared. If the starting weight value and the test weight value are found to be identical (provided that no substance has been discharged yet from the dosage-dispensing unit), this indicates an absence or only a small accumulation of electrostatic charges. If the two weight values are different from each other, the dispensing process can be blocked and the user can be warned. Obviously, it is also possible that an ionizer which is arranged in the dosage-dispensing device is switched on, either automatically or by intervention of the user, if electrostatic charges have been detected in the comparison described here.

In the sixth step 316, the dosage-dispensing program is started and the dosage material is delivered into the target container in accordance with the predefined mass that was entered in the first step 311. After the dispensing process has been completed, the dosage-dispensing unit is returned to the first position in step 317. Next, the weighing system measures an ending weight value in an eighth step 318. To calculate the weighed mass of dosage material, the starting weight value is subtracted from the ending weight value in a ninth step 319, which is performed by the processor unit. This calculated value which represents the weighed mass of dosage material can be transmitted directly to a further processing stage, for example to the indicator unit, or it can be stored in the memory unit for later processing. After the calculation of the weighed mass of dosage material the flowchart of the absolutely essential steps ends at 320.

Due to the influence of electrostatic charges, the weighed mass can deviate from the predefined mass. In order to bring the weighed mass of dosage material into closer agreement with the predefined mass, the steps 312 to 319 of the foregoing description can be repeated until the value of the weighed mass matches the predefined mass within a given tolerance range. This loop is indicated by a broken line.

Figure 4:
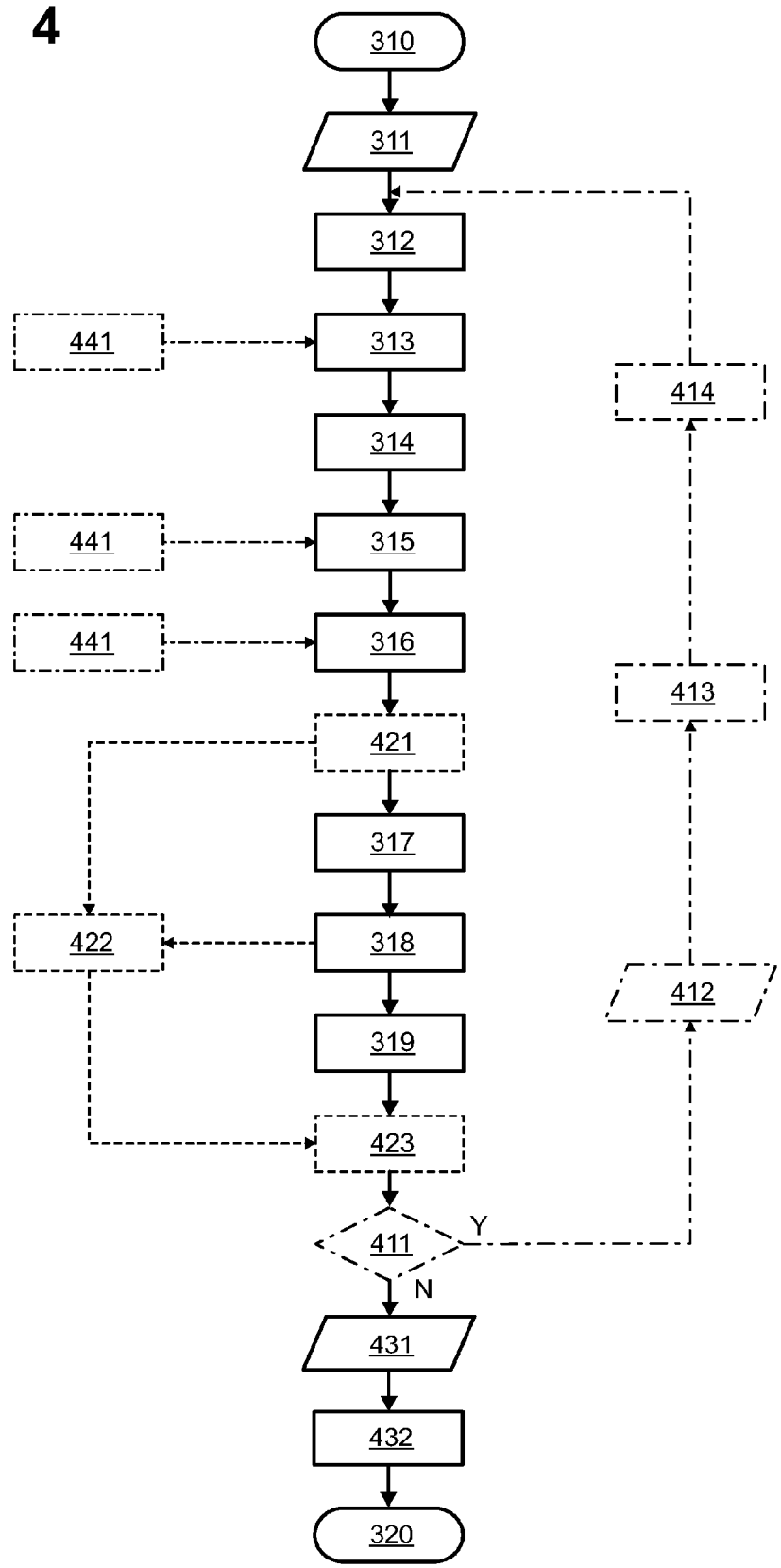
FIG. 4 represents a detailed flowchart of the method according to an example embodiment of the invention including further possible process steps of the kind that could be implemented in a computer program.

FIG. 4 illustrates how the flowchart of FIG. 3 can be expanded with additional process steps. FIG. 4 shows a detailed flowchart of the method 400 according to an example embodiment of the invention with further possible steps of the kind that can be implemented in a computer program. The steps that have already been discussed in the context of FIG. 3 are identified by the same reference symbols and are not explained again.

The four mixture-preparation steps 411, 412, 413 and 414 represent a first addition to the steps of flowchart 300. In the first mixture-preparation step 411, which occurs after the ninth step 319 or after the third correction step 423 which will be explained below, the user, the memory unit, or a higher-level process control system is interrogated and a yes/no response is requested whether a mixture is to be prepared with the substance already dispensed into the target container. If the answer is affirmative, the subsequent mixture-preparation steps 412, 413, 414 are executed and the second through ninth steps 312 to 319 are repeated.

In the second mixture-preparation step 412, the program calls for the mix ratio as an input from the user, the memory unit, or from a higher-level process control system. In the third mixture-preparation step 413, the dosage-dispensing unit that is currently seated in the holder device is removed. In the fourth mixture-preparation step 414, the mass amount of the next dosage material to be added is calculated based on the weighed mass of dosage material and the mix ratio. This is followed by the second through ninth steps 312 to 319.

After the second pass through the ninth step 319 has been completed, the interrogation of the second mixture-preparation step 412 takes place for the second time, so that a further substance can be added to the mixture of two substances in the target container. Analogous to the loop described in FIG. 3, it is also possible to use several passes with the same dosage-dispensing unit in order to obtain the desired mix ratio within a predefined mix-ratio tolerance.

Even if the starting weight value and the ending weight value are determined in the first position, they can still include an error, as the distance between the first position and the second position is subject to design limitations. This residual error can be corrected by means of the correction steps 421, 422 and 423, so that the weighed mass in its non-corrected actual amount can still be rectified. The first correction step 421, which occurs between the sixth step 316 and the seventh step 317, serves to establish an error weight value immediately after the dosage-dispensing process when the dosage-dispensing unit is still in the second position. The error weight value and the ending weight value determined in the eighth step 318 are now processed in the second correction step 422.

Based on Coulomb's law, which is mathematically expressed as $$F = \frac{1}{4\pi\varepsilon_o} \frac{q_1 \cdot q_2}{r^2} \qquad \text{(Eq. 1)}$$

the electrostatic force which acts in the upper position, or the correction value, can be calculated based on the distance $r_1$ of the first position from the load receiver, the distance $r_2$ of the second position from the load receiver, and the difference of the measured weighing error and the ending weight value. Based on Coulomb's law, one arrives at the following approximate correction value, which is expressed in the same units as the weight values and can be subtracted from the weighed mass determined in the ninth step 319:

$$\text{Correction } value_{(in\ first\ position)} = \frac{(\text{error value} - \text{ending weight value}) \times r_2^2}{r_1^2 - r_2^2} \qquad \text{(Eq. 2)}$$

The subtraction occurs in the third correction step 423 and leads to the value of the corrected mass which is transmitted to an indicator unit and/or stored in the memory unit and/or passed on to the process control system.

After all of the substance doses have been delivered, a measured quantity of solvent may in some cases have to be added to the target container in order to complete the preparation of the sample. Depending on whether or not the correction steps 421, 422 and 423 were applied, the mass of the selected solvent can be calculated based on the weighed mass or the corrected mass and the desired concentration. The program calls for the concentration and the selected solvent in the first sample-preparation step 431. The calculation of the mass of the solvent and the dispensing of the solvent occurs in the second sample-preparation step 432, after which the process has reached its end 320.

It should further be mentioned that the ionizer shown in FIG. 1 can be used during the different steps or between all of the steps of the method 400. The use of the ionizer, indicated as step 441, can occur for example during the third step 313, the fifth step 315 and the sixth step 316.

Obviously, the place of the user can also be taken by a handling system and a process control system for a fully automated sample preparation.

LIST OF REFERENCE SYMBOLS

100 dosage-dispensing device
105,105' dosage-dispensing unit
110',110 source container
111 first form-fitting element
113 lid
114 notch
115',115 memory module
121 second form-fitting element
122 dispensing head
123 memory module
124 outlet orifice
130 pass-through opening
131 coupling part
132 shutter shaft
150 drive device
151 first counterpart
152 slot bottom
153 retainer latch
154 coupling socket
155 drive source
156 drive shaft
157 upper part
158 lower part
159 linear-guiding device
160 locking device
165 processor unit
166 memory unit
170 rotation lock
175 read-/write device
181 second counterpart
185 liquid-dispensing head
186 hose connector
187 drive unit
188 threaded spindle
189 spindle nut
190 weighing system
191 load receiver
192 weighing cell
193 housing
200 target container
201 target container memory unit
250 ionizer
270 input-/output unit
400, 300 method
310 start
311 step 1: enter predefined mass of dosage material
312 step 2: install new dosage-dispensing unit 313 step 3: bring dosage-dispensing unit into first position
314 step 4: set target container in place and determine starting weight value
315 step 5: bring dosage-dispensing unit into second position
316 step 6: dosage-dispensing process
317 step 7: bring dosage-dispensing unit into first position
318 step 8: determine ending weight value
319 step 9: calculate the weighed mass of dosage material
320 end
340 test: acquire test weight value and compare to starting weight value
411 mixture preparation step 1: interrogation whether or not a powder mixture is desired
412 mixture preparation step 2: entry/input request for mix ratio
413 mixture preparation step 3: remove the currently installed dosage-dispensing unit
414 mixture preparation step 4: calculate mass of substance to be added
421 correction step 1: determine error weight value
422 correction step 2: calculate correction value
423 correction step 4: calculate corrected mass
431 sample preparation step 1: request input of desired concentration
432 sample preparation step 2: calculate and dispense required amount of solvent
441 use of ionizer

What is claimed is:

1. A method for the preparation of samples by means of a dosage-dispensing device comprising a weighing system with a load receiver, a processor unit, a memory unit, an ionizer, and an exchangeable dosage-dispensing unit, wherein one of a target container set on the load receiver or the dosage-dispensing unit comprises electrically insulating material, and wherein the dosage-dispensing unit has the capability to slide or swivel between a first position and a second position relative to the load receiver, the method comprising the steps of:
   (a) receiving at the processor unit from the weighing system and storing in the memory unit a starting weight value while the dosage-dispensing unit is at rest in the first position and the target container is on the load receiver;
   (b) after the dosage-dispensing unit is moved to the second position, transmitting from the processor unit to the dosage-dispensing unit a request to dispense into the target container a predetermined amount of mass;
   (c) after the dosage-dispensing unit is returned to the first position and is at rest, receiving at the processor unit from the weighing system an ending value; and
   (d) receiving at the processor unit from the weighing system intermediate weight values when the ionizer is switched off.

2. The method according to claim 1, further comprising detecting electrostatic charges by:
   receiving at the processor unit from the weighing system a test weight value determined in the second position and prior to the step of using the processor unit to deliver a mass from the dosage-dispensing unit; and
   comparing at the processor unit the test weight value to the starting weight value.

3. The method according to claim 1, further comprising subtracting at the processor unit the starting weight value from the ending weight value and storing the result in the memory unit or transmitting the result to an output unit as the weighed mass of the dosage material.

4. The method according to claim 3, further comprising:
   calculating at the processor unit a mass amount of a further dosage material based on the weighed mass of the dosage material and a desired mix ratio;
   replacing the dosage-dispensing unit with the dosage material that has already been dispensed by a further dosage-dispensing unit with the further dosage material; and
   repeating steps (a)-(d) with the further dosage-dispensing unit.

5. The method according to claim 3, further comprising:
   receiving at the processor unit from the weighing system an error weight value after the dosage-dispensing process has been completed and the dosage-dispensing unit is still in the second position;
   calculating at the processor unit a correction value based on the ending weight value, the error weight value and the distance between the first position and the second position; and
   calculating at the processor unit a corrected mass of the dosage material based on the weighed mass of the dosage material and the correction value.

6. The method according to claim 5, further comprising calculating at the processor unit a mass of a solvent to be added based on the weighed mass or the corrected mass of the dosage material and a desired concentration.

7. The method according to claim 1, further comprising receiving at the weighing system a plurality of intermediate weight values and transmitting the weight values to the processor unit for the control of the dosage-dispensing process.

8. The method according to claim 7, further comprising:
   evaluating at the processor unit at least two intermediate weight values, a time interval between them, and an aperture cross-section of the outlet orifice of the dosage-dispensing unit at the times when the intermediate weight values are measured; and
   determining at the processor unit a flow parameter that characterizes the flow properties of the dosage material.

9. The method according to claim 8, further comprising using the flow parameter to estimate a time profile for the closure based on whether the aperture cross-section of the outlet orifice of the dosage-dispensing unit is closed.

10. The method according to claim 1, further comprising operating the ionizer during the time when the dosage-dispensing unit is shifted from the first position into the second position.

11. The method according to claim 10, further comprising switching the ionizer on and off during the dosage-dispensing process.

12. The method according to claim 11, wherein receiving at the processor unit a plurality of intermediate weight values comprises receiving the weight values only while the ionizer is off.

13. A system comprising:
   a weighing system with a load receiver;
   a processor unit in communication with the weighing system;
   a memory unit;
   an ionizer; and
   an exchangeable dose-dispensing unit comprising electrically insulating material and with the capability to slide or swivel between a first position and a second position relative to the load receiver;
   the processor unit comprising executable instructions to:
   (a) receive at the processor unit from the weighing system and store in the memory unit a starting weight value while the dosage-dispensing unit is at rest in the first position and the target container is on the load receiver;

(b) after the dosage-dispensing unit is moved to the second position, transmit from the processor unit to the dosage-dispensing unit an instruction to dispense into the target container a predetermined amount of mass;
(c) after the dosage-dispensing unit is returned to the first position and is at rest, receive at the processor unit from the weighing system an ending value; and
(d) receive at the processor unit from the weighing system intermediate weight values when the ionizer is switched off.

14. The system of claim 13, wherein the dosage-dispensing unit is arranged above the load receiver of the weighing system and is movable in relation to the load receiver between a first position and a second position.

15. The system of claim 14, wherein the dosage-dispensing unit is constrained in its mobility by a vertical linear guide and is movable between the first position and the second position by means of a drive unit.

16. The system of claim 13, wherein the dosage-dispensing unit comprises a dosage-dispensing head for liquids through which a quantity of solvent that has been calculated by the processor unit can be dispensed into the target container.

\* \* \* \* \*